March 14, 1933.  W. M. WELSFORD  1,901,544
TRACTION WHEEL
Filed Nov. 26, 1930   2 Sheets-Sheet 1

INVENTOR
W.M. WELSFORD
ATTY.

March 14, 1933.  W. M. WELSFORD  1,901,544
TRACTION WHEEL
Filed Nov. 26, 1930  2 Sheets-Sheet 2
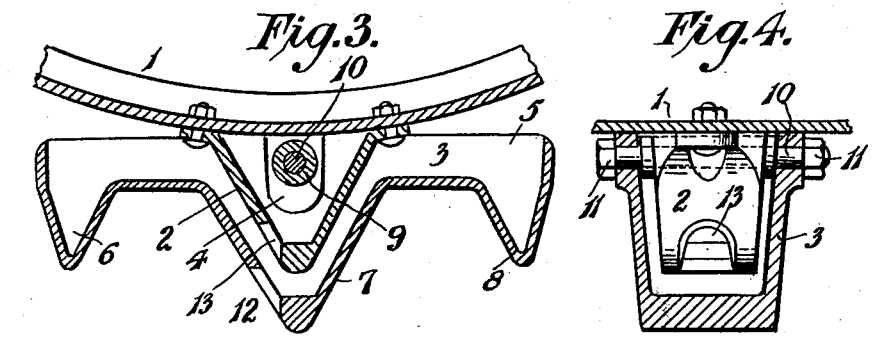
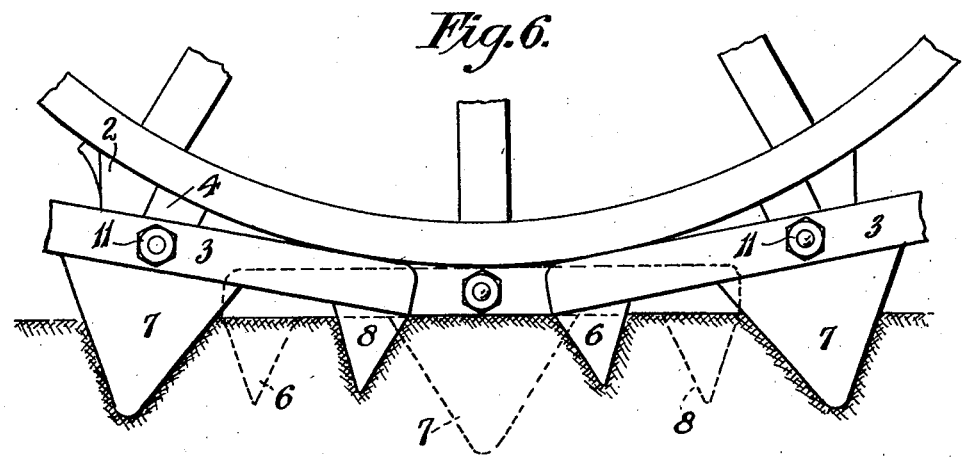
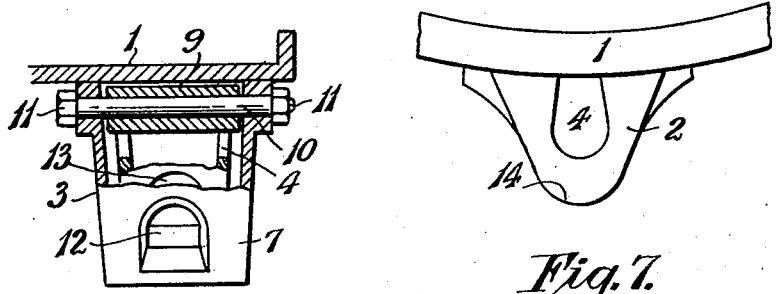
INVENTOR
W. M. WELSFORD
ATTY.

Patented Mar. 14, 1933

1,901,544

UNITED STATES PATENT OFFICE

WILLIAM MURRAY WELSFORD, OF MERINGUR, VICTORIA, AUSTRALIA

TRACTION WHEEL

Application filed November 26, 1930, Serial No. 498,474, and in Australia December 9, 1929.

This invention relates to improved grips for use on the traction wheels of farm tractors and other machines to improve the tractive efficiency of the wheel and to prevent slippage or sinking of the wheel when operating in sandy soil or other difficult country.

One object of the invention is to provide grip devices which can be fitted over the usual spud grips on traction wheels and are of such character as will obtain a very efficient grip, both when entering and leaving the ground. A further object is the provision of grip devices so constructed and mounted as to have limited pivotal movement relatively to the wheel rim to thus enable the grips to adjust themselves to the ground surface during the movement of the wheel and to assist in dislodging earth adhering to the wheel.

The invention consists essentially of the provision of a series of grip plates pivotally attached in spaced relationship to the periphery of the wheel, each of said grip plates being capable of limited movement outwardly from the wheel rim in addition to the ordinary pivotal movement. The grip plates preferably have three gripping members on their outer faces, positioned at the center and at the opposite ends thereof.

Referring now to the accompanying drawings:

Figure 3 is a longitudinal sectional view through one of the improved grips and a wheel rim.

Figures 4 and 5 are cross-sectional views.

Figure 6 is a diagrammatic view illustrating the action of the improved grips.

Figure 7 is a detail view of a modified form of spud grip.

In these views, 1 indicates the traction wheel of a farm tractor, 2 the usual spud grips secured to the face of the wheel rim, and 3 the improved grip plates which are fitted over the spud grips. For the purposes of the invention the spud grips 2 are modified from the ordinary construction by having formed in their sides elongated gaps or slots 4.

Figure 1:
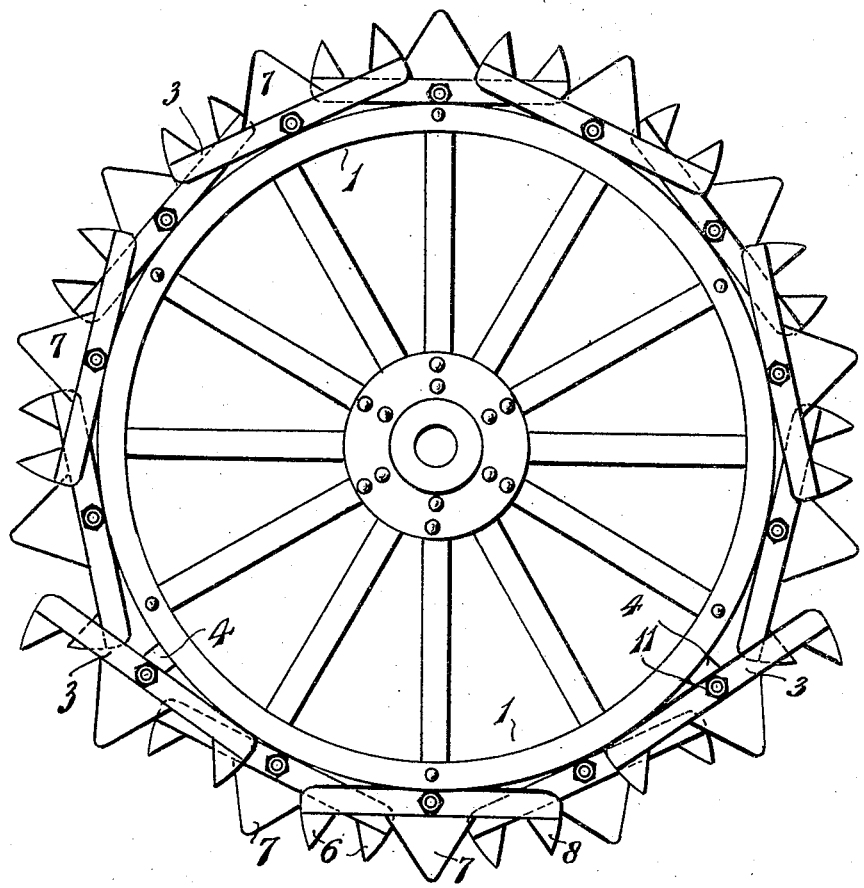
Figure 1 is a side view of a traction wheel fitted with the improved grips according to the invention.
Figure 2:
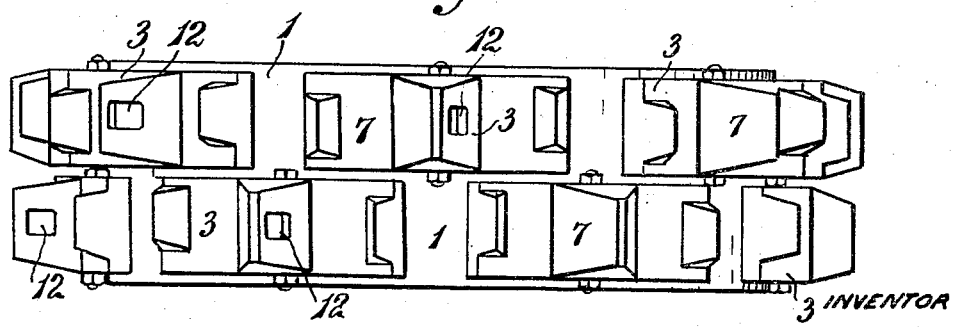
Figure 2 is a plan view of Figure 1.

In the example illustrated in the drawings, each grip plate 3 is substantially of rectangular construction having a hollowed inner side 5 to fit against the rim surface of the wheel. The exterior side of the grip plate has three gripping points 6, 7 and 8, preferably of tapered prismatic shape positioned at the center and at the opposite ends respectively of the grip plate. The central gripping point 7 preferably extends across approximately the full width of the grip plate and is of larger size than the two end gripping points 6 and 8. The end gripping points may extend only across a portion of the width of the grip plate and be in staggered arrangement relatively to each other, as shown in Figure 2.

The grip plate is fitted over the spud grip 2 in such a manner that said spud grip is accommodated within the hollowed central gripping member 7, as shown in Figure 3. The grip plate is supported upon a tubular pivot member or roller 9 which is loosely passed through the slots or gaps 4 in the spud grip 2, see Figure 5.

A pin or bolt 10 extends through said tubular member and its ends pass through holes in the sides of the grip plate, suitable split pins or nuts as 11 being fitted thereto to secure the pin in position.

During the operation of the wheel, the rear end gripping point 6 first penetrates the ground as shown at the right hand side of Figure 6, and as the wheel further advances the underside of the grip plate is pressed flatwise against the ground surface so that all three gripping points are in use, see dotted lines in Figure 6. After the center of the wheel has passed over the grip plate and the grip commences to leave the ground, the forward gripping point 8 is forced deeply into the ground to prevent slippage as shown at the left hand side of Figure 6. Thus, during all three positions, at least one of the gripping points is effectively in use.

The pivotal mounting of the grip plates enables each plate to freely adjust itself during the movement of the wheel, thus maintaining the under surfaces of the grip plates in flatwise engagement with the ground surface to ensure maximum gripping surface when the weight of the wheel or machine is exerted directly thereon. The slots 4 in the spud grips enable the grip plates to have limited slidable movement outwardly from the wheel rim, enabling the grip plates to assume angular positions relatively to the wheel rim when about to enter or leave the ground. This ensures effective penetration of the end gripping points 6 and 8 into the ground. The limited outward slidable movement of the grip plates also assists in dislodging earth adhering to the wheel. The tubular pivot member 9 functions to minimize friction by providing a rolling mounting for the grip device. If desired, said tubular member may be case-hardened to reduce wear.

The central gripping point 7 of each grip plate may have a gap as 12 formed in one of its side faces to enable sand which may collect within the hollow interior of the grip to pass freely therethrough. If desired, a similar gap 13 may be formed in the spud grip to register with the gap 12 in the grip device. In the modified form of spud grip shown in Figure 7, the outer end part 14 is rounded instead of being pointed, and the slot 4 may be made wider at the outer end than at the inner end. The object of this construction is to facilitate the pivotal movement of the grip device 3.

Preferably, two parallel series of grip plates are provided on each wheel and the grips of one series are arranged out of line with those of the other series, as shown in Figures 2 and 6, so that at least two of said grip plates are always in engagement with the ground surface.

What I do claim is:

A two-part traction lug for wheels comprising a hollow, substantially V-shape plate, said V-shape plate having aligned, elongated slots in its opposite side walls, a hollow gripping element formed with a substantially V-shape central, depending, hollow ground-engaging extension forming a pocket to receive the hollow V-shape plate, said pocket being of larger volume than the hollow V-shape plate to permit movement of the gripping element, the V-shape gripping element having hollow, depending end extensions of less depth than the central V-shape extension, a bolt connecting the side walls of the hollow gripping element and extending through the elongated slots, a roller mounted on the bolt whereby to permit the hollow gripping element to have a sliding and a pivotal movement on the V-shape plate, the side walls of the elongated slots engaging the roller in the movement of the gripping element.

In testimony whereof I affix my signature.

WILLIAM MURRAY WELSFORD.